US012574111B2

(12) United States Patent
 Kawai

(10) Patent No.: US 12,574,111 B2
(45) Date of Patent: Mar. 10, 2026

(54) LIGHT CONTROL DEVICE, METHOD FOR CONTROLLING LIGHT CONTROL DEVICE, AND RECORDING MEDIUM

(71) Applicant: NEC Corporation, Tokyo (JP)

(72) Inventor: Motoyoshi Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 259 days.

(21) Appl. No.: 18/279,324

(22) PCT Filed: Jan. 11, 2022

(86) PCT No.: PCT/JP2022/000464
 § 371 (c)(1),
 (2) Date: Aug. 29, 2023

(87) PCT Pub. No.: WO2022/185711
 PCT Pub. Date: Sep. 9, 2022

(65) Prior Publication Data
 US 2024/0154692 A1    May 9, 2024

(30) Foreign Application Priority Data
 Mar. 3, 2021    (JP) ................................. 2021-033113

(51) Int. Cl.
 *H04B 10/077* (2013.01)
 *H04B 10/29* (2013.01)
 (Continued)

(52) U.S. Cl.
 CPC ........... *H04B 10/077* (2013.01); *H04B 10/29* (2013.01); *H04B 10/294* (2013.01); *H04J 14/0227* (2013.01)

(58) Field of Classification Search
 CPC .......... H04B 10/075–0799; H04B 10/294–296
 See application file for complete search history.

(56) References Cited

U.S. PATENT DOCUMENTS

| 6,211,983 B1 | 4/2001 | Shiragaki |
| 6,873,795 B1 | 3/2005 | Sugaya |
| (Continued) |

FOREIGN PATENT DOCUMENTS

| JP | H05-344067 A | 12/1993 |
| JP | H10-290198 A | 10/1998 |
| (Continued) |

OTHER PUBLICATIONS

JP Office Action for JP Application No. 2023-503598, mailed on Sep. 17, 2024 with English Translation.
(Continued)

*Primary Examiner* — Nathan M Cors
(74) *Attorney, Agent, or Firm* — Sughrue Mion, PLLC

(57) ABSTRACT

In order to provide technologies for implementing a control light receiving function and a signal light monitoring function by means of a simple configuration, this light control device includes: a wavelength-variable filter having a variable transmissive wavelength for transmitting input light; a photoelectric converter for converting output light from the wavelength-variable filter into an electric signal; and a controller for setting a transmissive wavelength and controlling a communication device on the basis of an electric signal corresponding to the transmissive wavelength.

10 Claims, 8 Drawing Sheets

(51) Int. Cl.
  H04B 10/294 (2013.01)
  H04J 14/02 (2006.01)

(56) References Cited

U.S. PATENT DOCUMENTS

| 7,668,459 | B2 * | 2/2010 | Inui | H04B 10/07951 |
| | | | | 398/28 |
| 2003/0067655 | A1 * | 4/2003 | Pedersen | H04J 14/0227 |
| | | | | 398/49 |
| 2004/0057732 | A1 * | 3/2004 | Usui | H01S 3/1301 |
| | | | | 398/177 |
| 2005/0169633 | A1 * | 8/2005 | Nakagawa | H04J 14/0204 |
| | | | | 398/85 |
| 2007/0014513 | A1 * | 1/2007 | Isomura | H04J 14/0212 |
| | | | | 385/24 |
| 2012/0051737 | A1 * | 3/2012 | DeAndrea | H04B 10/695 |
| | | | | 398/25 |
| 2013/0294770 | A1 * | 11/2013 | Hino | H04J 14/0287 |
| | | | | 398/34 |
| 2014/0270781 | A1 * | 9/2014 | Nakagawa | H04J 14/0201 |
| | | | | 398/83 |
| 2020/0412476 | A1 * | 12/2020 | Aida | H04B 10/0777 |

FOREIGN PATENT DOCUMENTS

| JP | H11-041208 | A | 2/1999 |
| JP | 2000-183854 | A | 6/2000 |
| JP | 2014-179954 | A | 9/2014 |

OTHER PUBLICATIONS

International Search Report for PCT Application No. PCT/JP2022/000464, mailed on Apr. 12, 2022.

English translation of Written opinion for PCT Application No. PCT/JP2022/000464, mailed on Apr. 12, 2022.

* cited by examiner

LIGHT CONTROL DEVICE, METHOD FOR CONTROLLING LIGHT CONTROL DEVICE, AND RECORDING MEDIUM

This application is a National Stage Entry of PCT/JP2022/000464 filed on Jan. 11, 2022, which claims priority from Japanese Patent Application 2021-033113 filed on Mar. 3, 2021, the contents of all of which are incorporated herein by reference, in their entirety.

TECHNICAL FIELD

The present invention relates to a light control device, a method for controlling a light control device, and a recording medium, and relates more particularly to a light control device, a method for controlling a light control device, and a recording medium that are used in an optical submarine cable system.

BACKGROUND ART

In order to cope with various network configurations, high functionalization of submarine machines such as a repeater, a branching device, and a reconfigurable optical add drop multiplexer (ROADM) that are used in an optical submarine system has been progressing. In addition to a function of monitoring a state of a submarine machine or transmission quality of a spectrum or the like of signal light, the submarine machine is required to have a function of receiving control light for the submarine machine and executing control according to a control instruction extracted from the control light.

In order to achieve the function of controlling the submarine machine with the control light and the function of monitoring the signal light, a general submarine machine is required to include a photoelectric conversion unit and a control unit. The photoelectric conversion unit generates an electric signal according to intensity of received light. The control unit controls the submarine machine and monitors the signal light, based on an electric signal being output from a photoelectric conversion element. A device such as an optical channel monitor (OCM) or a wavelength selective switch (WSS) is mounted inside the submarine machine in such a way as to monitor spectrum of the signal light.

In relation to the present invention, PTL 1 describes a light relay system including a monitoring turnback circuit.

CITATION LIST

Patent Literature

PTL 1: Japanese Unexamined Patent Application Publication No. H05-344067

SUMMARY OF INVENTION

Technical Problem

In general, the control light is transmitted simultaneously with the signal light, and has a wavelength different therefrom. Thus, the submarine machine is required to provide a wavelength splitter that performs wavelength splitting for the control light and the signal light, a first photoelectric conversion unit that receives the control light, and a second photoelectric conversion unit that receives the control light, in such a way as to receive the control light and the signal light independently. Specifically, there is a problem that many components are required for mounting the function of receiving the control light for the submarine machine and the function of monitoring the signal light, which also complicates a circuit configuration. Further, in view of this, there is also a problem that a large area for mounting these components is required.

Object of Invention

An object of the present invention is to provide a technique for achieving a function of receiving control light and a function of monitoring signal light with a simple configuration.

Solution to Problem

A light control device according to the present invention includes: a wavelength-variable filter configured to have a variable transmissive wavelength at which input light passes through; a photoelectric conversion means for converting output light from the wavelength-variable filter into an electric signal; and a control means for setting the transmissive wavelength and controlling a communication device, based on the electric signal associated with the transmissive wavelength.

A method for controlling a light control device according to the present invention includes procedures of: setting a transmissive wavelength at which input light passes through, to a wavelength-variable filter; converting output light from the wavelength-variable filter into an electric signal; and controlling a communication device, based on the electric signal associated with the transmissive wavelength.

A recording medium according to the present invention records a program for causing a computer of a light control device to execute: a procedure of setting a transmissive wavelength at which input light passes through, to a wavelength-variable filter; a procedure of converting output light from the wavelength-variable filter into an electric signal; and a procedure of controlling a communication device, based on the electric signal associated with the transmissive wavelength.

Advantageous Effects of Invention

The present invention provides a technique for achieving a function of receiving control light and a function of monitoring signal light with a simple configuration.

EXAMPLE EMBODIMENT

Figure 1:
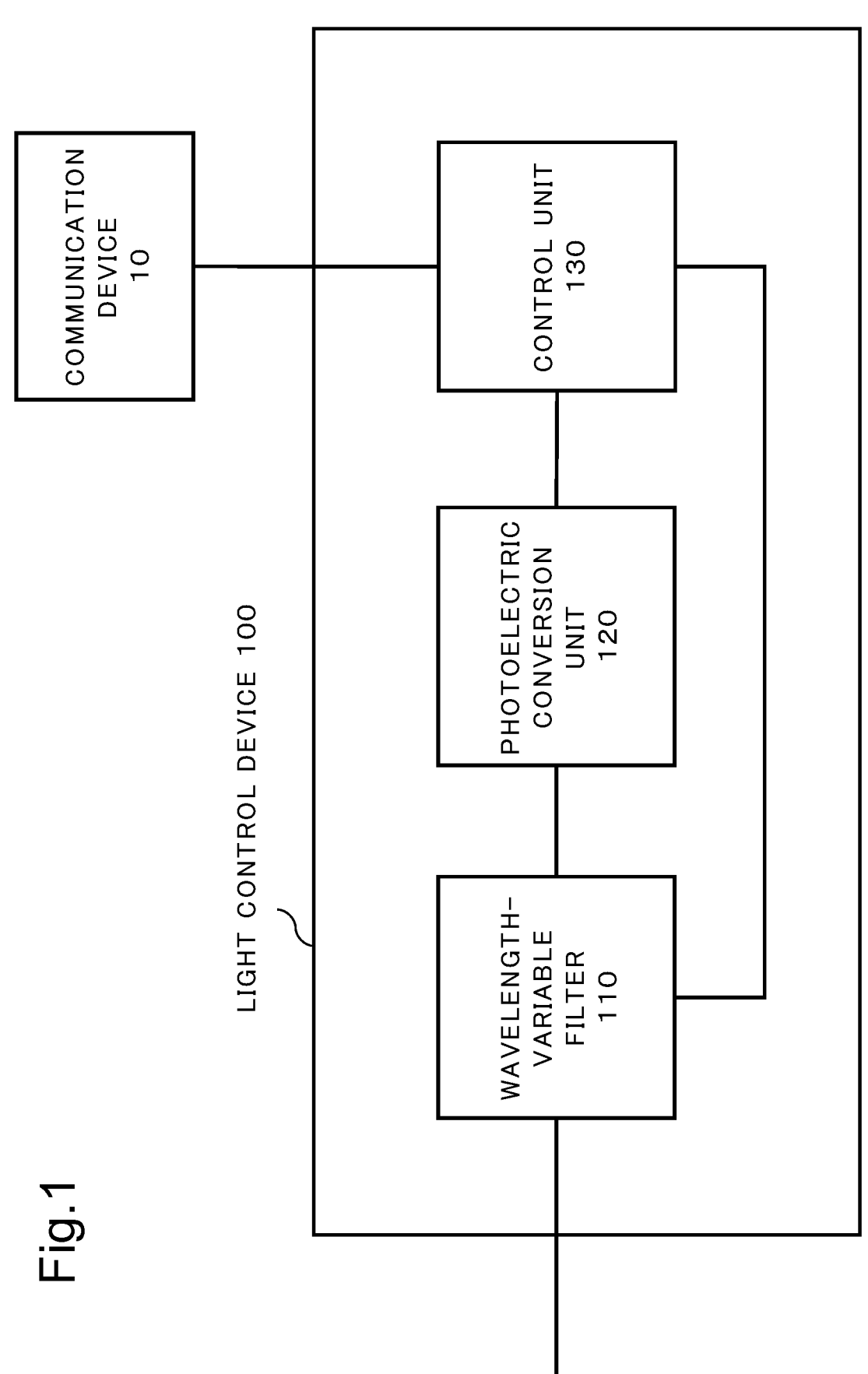
FIG. 1 is a block diagram illustrating a configuration example of a light control device 100 of a first example embodiment.

Example embodiments of the present invention are described below with reference to the drawings. The arrows illustrated in the drawings depict directions of a signal or orders of processing, and are not intended put limitations on them. In the example embodiments and the drawings, aforementioned elements are denoted with the same reference symbols, and overlapping description thereof is omitted.

First Example Embodiment

FIG. 1 is a block diagram illustrating a configuration example of a light control device 100 of a first example embodiment. The light control device 100 includes a wavelength-variable filter 110, a photoelectric conversion unit 120, and a control unit 130. FIG. 1 also describes a communication device 10 connected to the control unit 130. The light control device 100 controls some or all of the functions of the communication device 10. The light control device 100 may be included in the communication device 10. For example, when the communication device 10 is a repeater, the light control device 100 may be included as a light control unit in the repeater. In this case, the light control unit controls some or all of the functions of the repeater.

The wavelength-variable filter 110 outputs a part of a wavelength band of light input to the wavelength-variable filter 110 (input light), as output light. A micro electro mechanical system (MEMS) or a wavelength selective switch (WSS) may be used as the wavelength-variable filter 110. A wavelength band of light passing through the wavelength-variable filter 110 (transmissive wavelength) is set by an electric signal output from the control unit 130. Specifically, the control unit 130 controls the transmissive wavelength of the wavelength-variable filter 110. The width of the transmissive wavelength may be a width for causing a plurality of carriers contained in the input light to pass through, or may be a width for causing only one optical carrier to pass through. The photoelectric conversion unit 120 functions as a photoelectric conversion means for converting output light from the wavelength-variable filter 110 into the electric signal. For example, the photoelectric conversion unit 120 includes a photodiode, and outputs the electric signal having an amplitude associated with the intensity of the output light from the wavelength-variable filter 110. The electric signal output from the photoelectric conversion unit 120 is output to the control unit 130. The control unit 130 sets the transmissive wavelength of the wavelength-variable filter 110, and controls the communication device 10, based on the electric signal that is input from the photoelectric conversion unit 120 and is associated with the transmissive wavelength. The control unit 130 is an electric circuit functioning as a control means.

The transmissive wavelength of the wavelength-variable filter 110 is set as appropriate, and thus, when light acquired by wavelength-multiplexing control light and signal light is input to the wavelength-variable filter 110, the control unit 130 is capable of acquiring the electric signal associated with each of the control light and the electric signal independently from the photoelectric conversion unit 120. It is assumed that the control light is an optical signal including a control instruction and has a wavelength of $\lambda 1$. A general procedure is applicable to a procedure of including the control instruction in the control light. For example, it is assumed that the signal light is an optical signal including data relating to a user and has a wavelength of $\lambda 2$. Further, in the present example embodiment and the following example embodiments, it is assumed that the wavelength $\lambda 1$ of the control light and the wavelength $\lambda 2$ of the signal light do not overlap with each other.

When the control unit 130 sets the transmissive wavelength of the wavelength-variable filter 110 as $\lambda 1$, the control light having the wavelength $\lambda 1$ passes through the wavelength-variable filter 110, and the signal light having the wavelength $\lambda 2$ is blocked by the wavelength-variable filter 110. As a result, the control unit 130 is capable of acquiring, from the photoelectric conversion unit 120, the electric signal associated with the intensity of the control light. The control unit 130 extracts the control instruction from the electric signal acquired from the photoelectric conversion unit 120 by a predetermined procedure. Further, the control unit 130 executes the extracted control instruction. The control unit 130 may output an instruction for controlling the communication device 10, based on the extracted control instruction. With this, the control unit 130 is capable of controlling the communication device.

Further, when the control unit 130 sets the transmissive wavelength as $\lambda 2$, the control light having the wavelength $\lambda 1$ is blocked by the wavelength-variable filter 110, and the signal light having the wavelength $\lambda 2$ passes through the wavelength-variable filter 110. As a result, the control unit 130 is capable of acquiring, from the photoelectric conversion unit 120, the electric signal having an amplitude associated with the intensity of the signal light. In this case, the control unit 130 is capable of monitoring the intensity of the signal light by using the amplitude of the electric signal acquired from the photoelectric conversion unit 120. Moreover, when the wavelength of the signal light falls within a range from $\lambda 3$ to $\lambda 4$, the control unit 130 is capable of acquiring a spectrum of the signal light by sweeping the transmissive wavelength between $\lambda 3$ and $\lambda 4$ in the band width associated with a wavelength resolution required for monitoring. Similarly, the control unit 130 may acquire a spectrum associated with a wavelength range of the control light. The control unit 130 may further include a storage unit including a semiconductor memory, a fixed magnetic disk device, or the like. The storage unit stores data relating to the extracted control instruction and an execution result thereof, and the acquired spectrum. The control unit 130 may include a function of notifying the communication device 10 of the contents stored in the storage unit.

Figure 2:
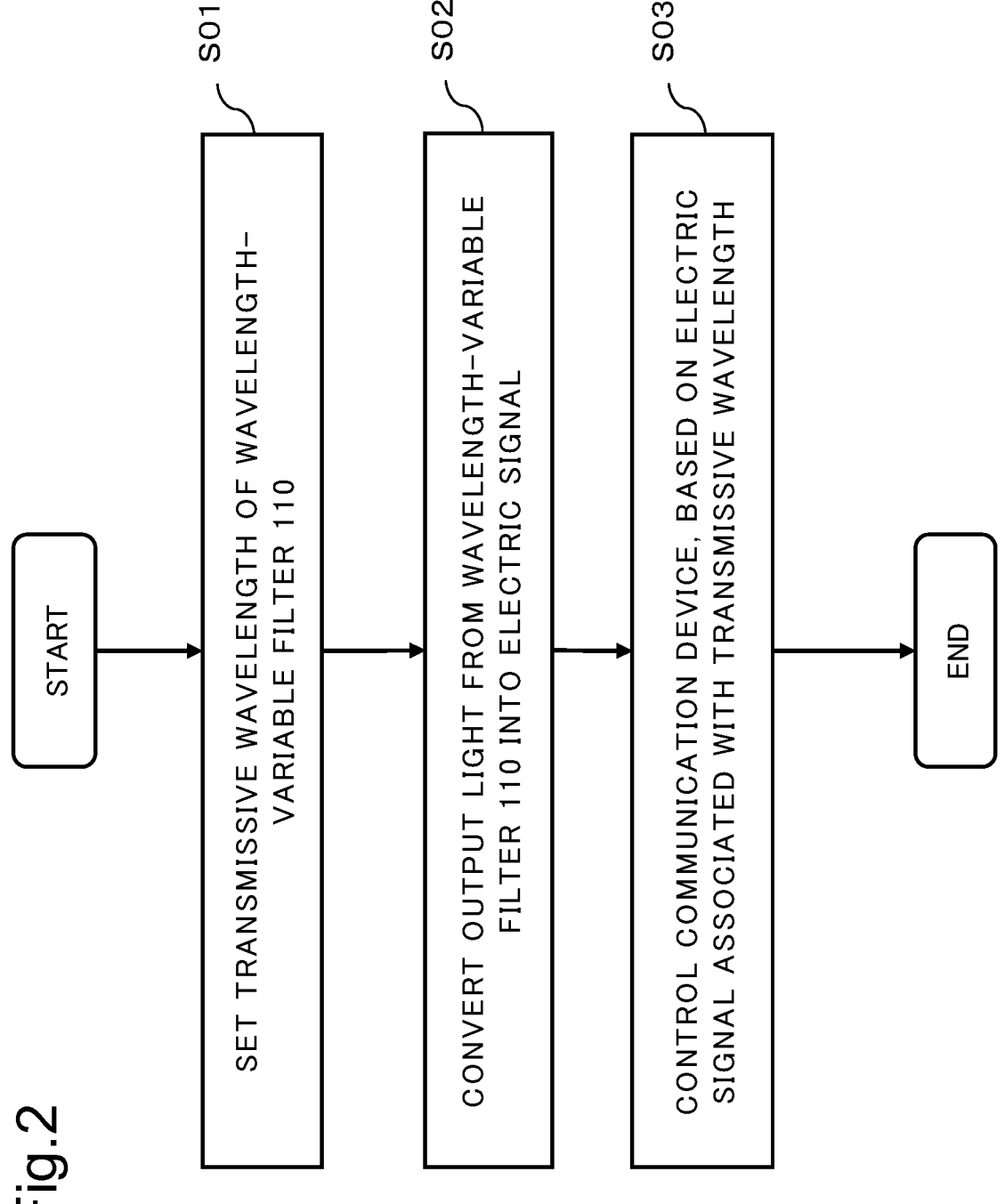
FIG. 2 is a flowchart illustrating an operation example of the light control device 100.

FIG. 2 is a flowchart illustrating an operation example of the light control device 100. The control unit 130 sets the transmissive wavelength of the wavelength-variable filter 110 (step S01 in FIG. 2). The photoelectric conversion unit 120 converts the output light from the wavelength-variable filter 110 into the electric signal (step S02). Further, the control unit 130 controls the communication device, based on the electric signal associated with the transmissive wavelength (step S03).

In the light control device 100 thus configured, the function of receiving the control light and the function of monitoring the signal light can be achieved by the wavelength-variable filter 110, the photoelectric conversion unit 120, and the control unit 130 without providing a splitter or a photoelectric conversion unit dedicated for each light. As a result, the number of photoelectric conversion units and a mounting area can be reduced. This contributes to reduction in power consumption and size of the light control device 100 and the system including the same. In this manner, the light control device 100 of the first example embodiment can achieve the function of receiving the control light and the function of monitoring the signal light with a simple configuration.

Second Example Embodiment

Figure 3:
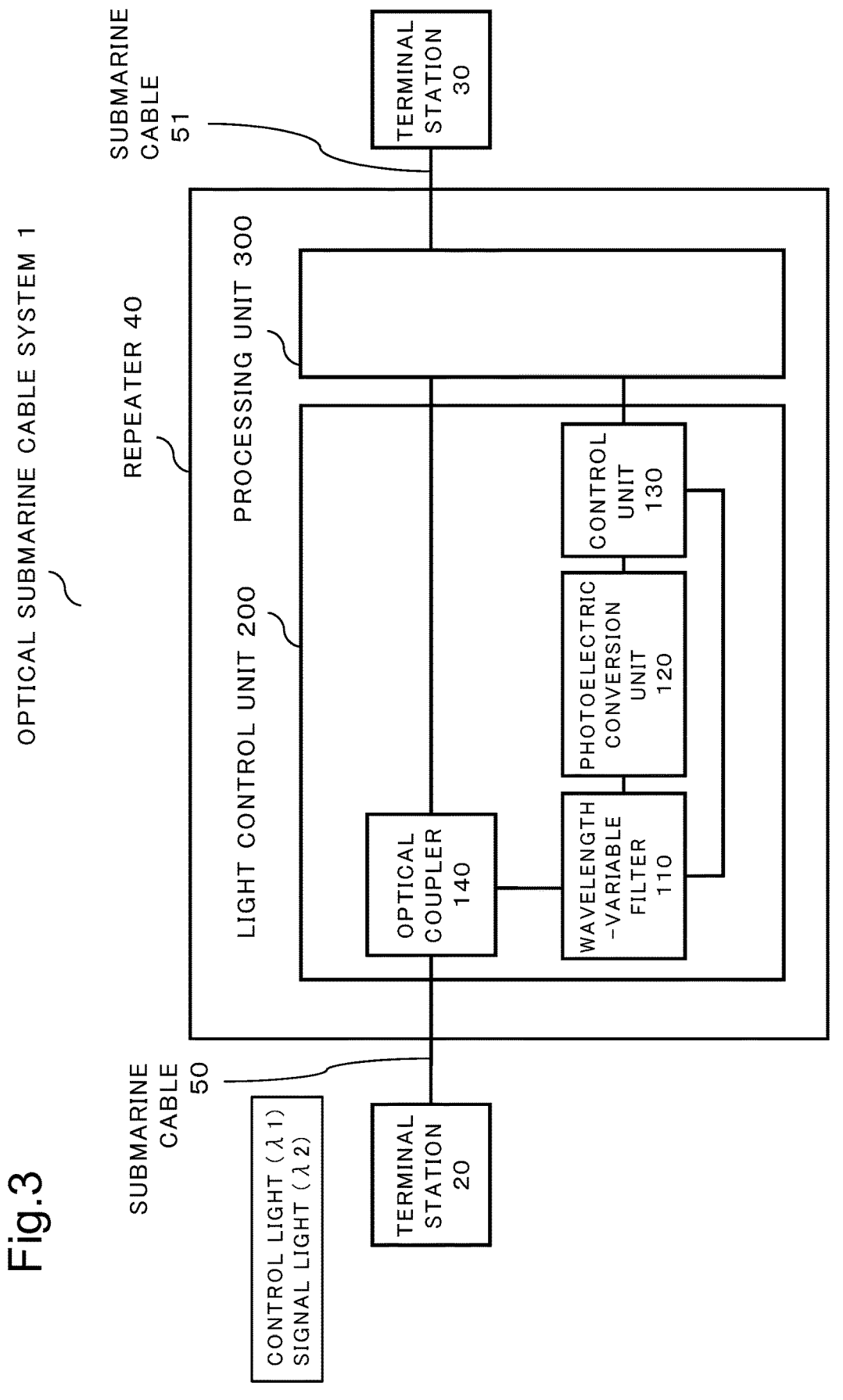
FIG. 3 is a diagram illustrating a configuration example of an optical submarine cable system 1 of a second example embodiment.

FIG. 3 is a diagram illustrating a configuration example of an optical submarine cable system 1 of a second example embodiment. The optical submarine cable system 1 is an optical communication system in which a terminal station 20, a repeater 40, and a terminal station 30 are connected via submarine cables 50 and 51. The terminal stations 20 and are installed on land. The repeater 40 is a submarine machine installed on the ocean floor. The terminal station 20 and the terminal station 30 communicate with each other via the repeater 40. The terminal station 20 transmits, to the submarine cable 50, the light acquired by wavelength-multiplexing the control light having the wavelength λ1 and the signal light having the wavelength λ2. The control light may include the control instruction for controlling the repeater 40. The signal light is an optical signal transmitted from the terminal station 20 to the terminal station 30, and includes data relating to a user of the optical submarine cable system 1. The repeater 40 receives the control light and the signal light from the terminal station 20, and then transmits the light associated with the received signal to the terminal station 30 via the submarine cable 51. A branching device of the submarine cable or another repeater may be arranged in at least one of a space between the terminal station 20 and the repeater 40 and a space between the repeater and the terminal station 30.

The repeater 40 includes a light control unit 200 and a processing unit 300. The processing unit 300 is a function block including a circuit that provides a relay function of the repeater 40. For example, the processing unit 300 includes an optical amplifier, and amplifies the signal light to be output to the terminal station 30. Alternatively, the processing unit 300 may include an optical filter or an optical equalizer, and may operate the spectrum of the signal light to be output to the terminal station 30. The processing unit 300 may include at least one of the optical amplifier, the optical filter, and the optical equalizer. However, the configuration and the function of the processing unit 300 are not limited thereto. The processing unit 300 may be operated under control of the light control unit 200.

The light control unit 200 is acquired by adding an optical coupler 140 to the light control device 100 of the first example embodiment. The optical coupler 140 splits the light received from the terminal station (specifically, the light acquired by wavelength-multiplexing the control light having the wavelength λ1 and the signal light having the wavelength λ2) into two directions. One piece of the split light is output to the wavelength-variable filter 110. Another piece of the split light is output to the terminal station 30. The another piece of the split light may be subjected to processing by the processing unit 300. For example, the optical coupler 140 is an optical directional coupler having one input and two outputs.

The configurations and the operations of the wavelength-variable filter 110, the photoelectric conversion unit 120, and the control unit 130 that are included in the light control unit 200 are similar to those in the first example embodiment. Specifically, the control light having the wavelength λ1 and the signal light having the wavelength λ2 that are transmitted from the terminal station 20 are input to the wavelength-variable filter 110. Further, the control unit 130 sets the transmissive wavelength of the wavelength-variable filter 110 as the wavelength λ1, and thus is capable of acquiring, from the photoelectric conversion unit 120, the electric signal associated with the intensity of the control light that is transmitted from the terminal station 20. As a result, the control unit 130 is capable of controlling the repeater 40 according to the control instruction extracted from the electric signal.

Further, the control unit 130 sets the transmissive wavelength as the wavelength λ2, and thus is capable of acquiring, from the photoelectric conversion unit 120, the electric signal associated with the intensity of the signal light transmitted from the terminal station 20. Moreover, the control unit 130 sweeps the transmissive wavelength of the wavelength-variable filter 110, and thus is capable of acquiring the spectrum of the signal light transmitted from the terminal station 20. Similarly, the control unit 130 may acquire the spectrum of the control light. Meanwhile, the another piece of the light split by the optical coupler 140 is output to the terminal station 30, and hence the function of relaying the signal light that the repeater 40 includes is maintained. The repeater 40 may include a function of transmitting, to the terminal station 30, data including at least one of the control instruction acquired from the control light by the control unit 130 and an execution result thereof, and information relating to the intensity or the spectrum acquired from the signal light. With this function, the terminal station 30 is capable of confirming a state of the light control unit 200.

The transmissive wavelength of the wavelength-variable filter 110 and a time at which the transmissive wavelength is set (specifically, information relating to a timing at which those settings are executed) are stored as data in the control unit 130. For example, the timing information may be stored in advance in the control unit 130, based on the specifications of the control light in the optical submarine cable system 1 in which the repeater 40 is used. Further, for example, the repeater 40 may acquire the timing information from the terminal station 20 by using a function of communicating with the outside of the repeater 40 that the repeater 40 include, and may cause the control unit 130 to store the timing information.

In this manner, in the repeater 40 of the second example embodiment, the function of receiving the control light and the function of monitoring the signal light can be achieved by the wavelength-variable filter 110, the photoelectric conversion unit 120, and the control unit 130 without providing a photoelectric conversion unit dedicated for each light. As a result, the number of optical components and a mounting area for achieving the function of receiving the control light and the function of monitoring the signal light can be reduced while the repeater 40 maintains the function of relaying the signal light. This contributes to reduction in power consumption and size of the optical submarine cable system 1 including the repeater 40.

First Modification Example of Second Example Embodiment

Figure 4:
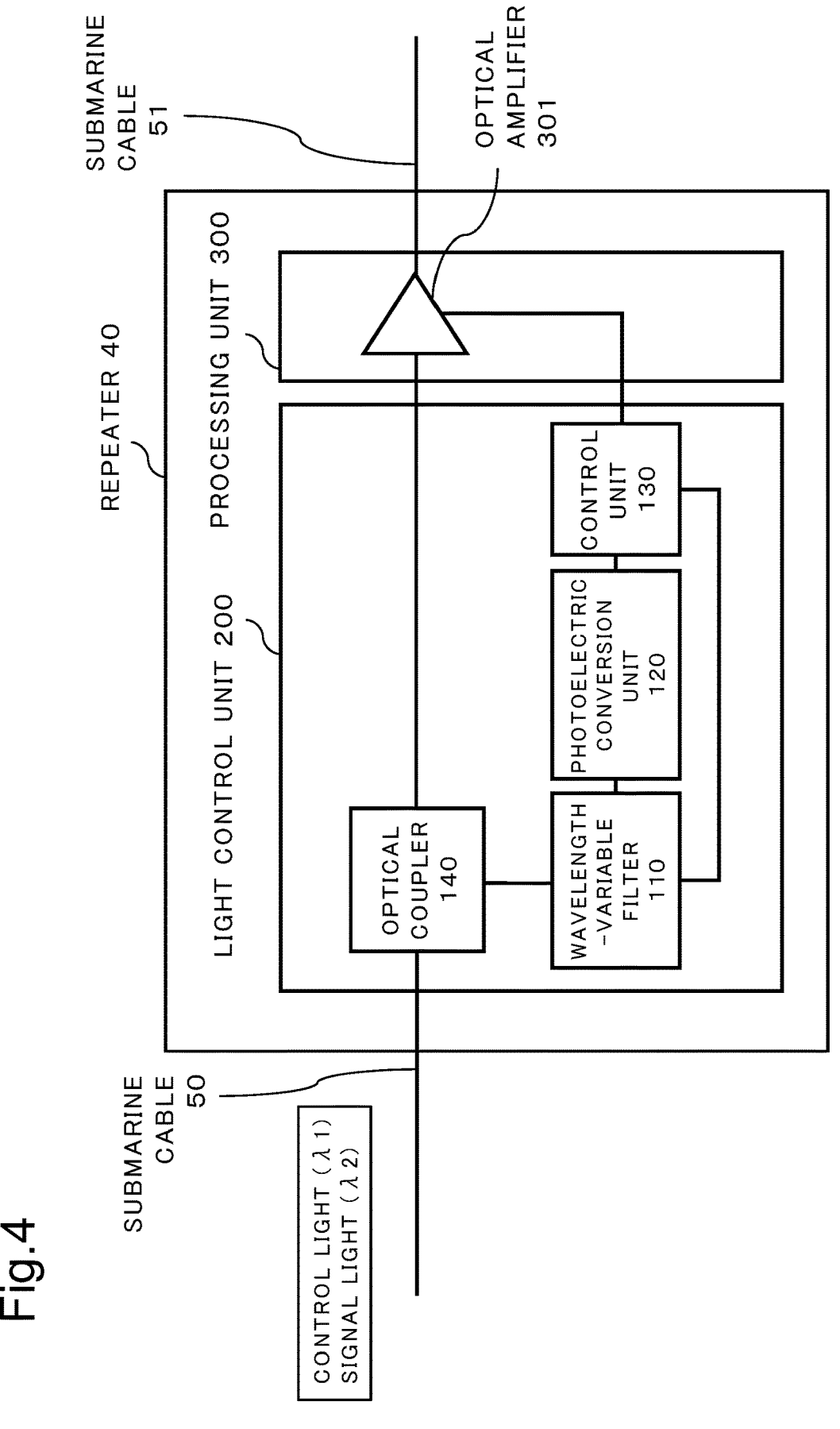
FIG. 4 is a block diagram illustrating a first modification example of a repeater 40 of the second example embodiment.

FIG. 4 is a block diagram illustrating a first modification example of the repeater 40 of the second example embodiment. In FIG. 4, the processing unit 300 includes an optical amplifier 301. The optical amplifier 301 includes the control circuit, and amplifies the control light and the signal light that are split by the optical coupler 140 according to the instruction from the control unit 130. The light amplified by the optical amplifier 301 is output to the terminal station 30. For example, the control unit 130 sets the transmissive wavelength of the wavelength-variable filter 110 in such a way that the photoelectric conversion unit 120 outputs the electric signal associated with the control light to the control unit 130. Further, the control unit 130 controls the optical amplifier 301, based on the extracted control instruction. When the control instruction is an instruction for specifying an output level of the optical amplifier 301, the optical amplifier 301 performs control in such a way that the output level approaches the specified level. When the optical amplifier 301 is an optical fiber amplifier, the optical amplifier 301 may control an output level of an excitation light source included in the optical amplifier 301 in such a way that the output level is the value specified by the control unit 130. The level of the signal light can be adjusted by the optical amplifier 301.

Alternatively, the control unit 130 may set the transmissive wavelength of the wavelength-variable filter 110 in such a way that the photoelectric conversion unit 120 outputs the electric signal associated with the signal light to the control unit 130. In this case, the control unit 130 estimates a level of the signal light input (input level) to the repeater 40 from the electric signal associated with the signal light. When a difference between the estimated input level and a predetermined value is large, the control unit 130 controls a gain of the optical amplifier 301 in such a way as to compensate the difference. Fluctuations of the level of the signal light output from the repeater 40 due to fluctuations of the input level can be suppressed by controlling the gain of the optical amplifier 301 as described above.

The terminal station 20 transmits the control light including the control instruction in such a way that the optical amplifier 301 is operated with a desired property. The predetermined parameter value (for example, the input level, the output level, or the gain) to be used for controlling the optical amplifier 301 may be stored in advance in the control unit 130, or may be notified in another control instruction from the terminal station 20.

When a variable optical attenuator is used in place of the optical amplifier 301, the level of the light output from the repeater 40 can be controlled. For example, when the control instruction specifies an attenuation amount of an optical attenuator, the control unit 130 controls the variable optical attenuator in such a way that the attenuation amount of the variable optical attenuation is the value.

Second Modification Example of Second Example Embodiment

Figure 5:
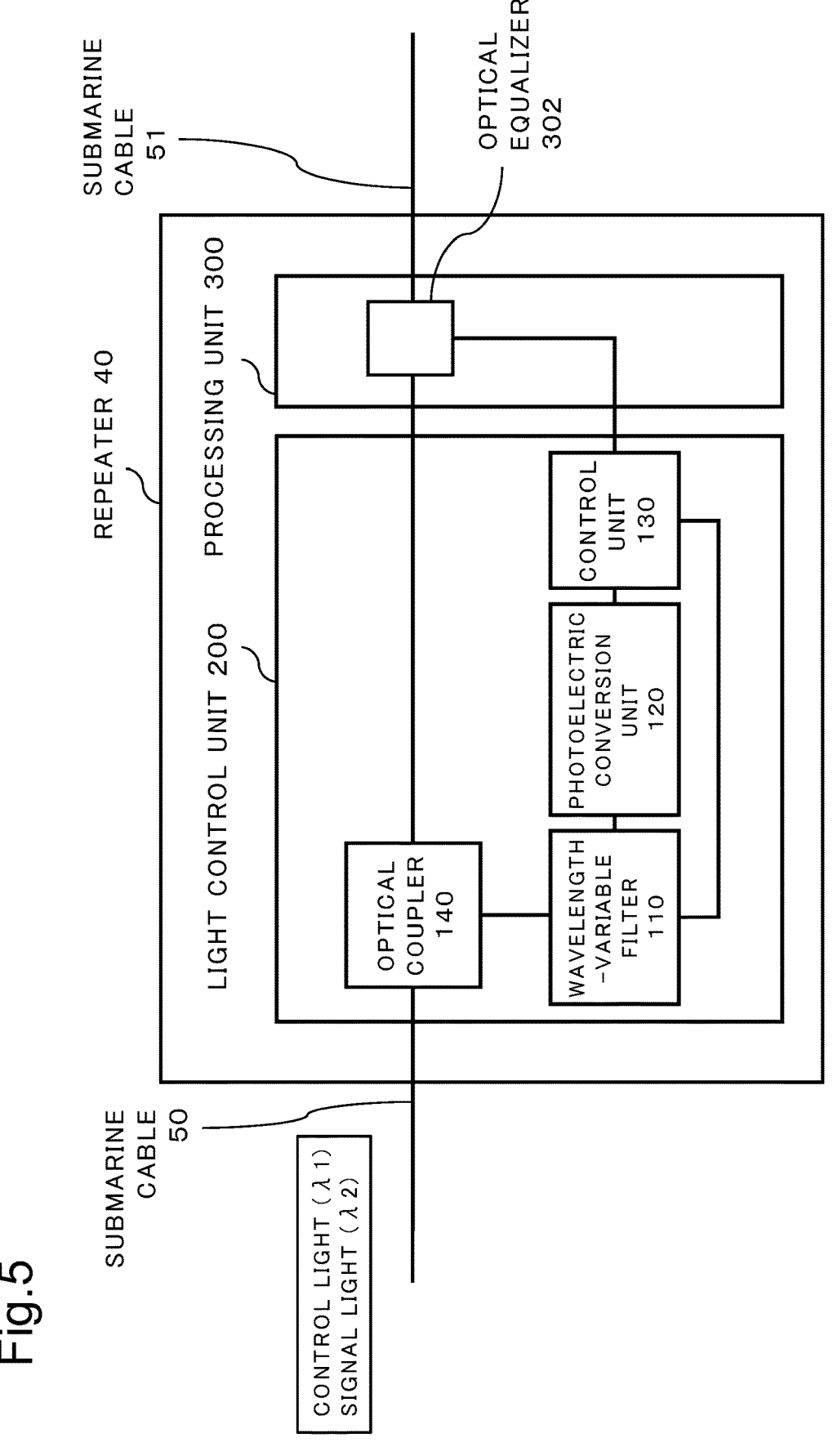
FIG. 5 is a block diagram illustrating a second modification example of the repeater 40 of the second example embodiment.

FIG. 5 is a block diagram illustrating a second modification example of the repeater 40 of the second example embodiment. In FIG. 5, the processing unit 300 includes an optical equalizer 302. The control unit 130 sets an attenuation amount of the optical equalizer 302 as values different from each other according to wavelengths. By using the optical equalizer 302, the spectrum of the signal light to be output to the submarine cable 51 can be adjusted. When the signal light is wavelength-multiplex optical signal containing a plurality of optical carriers having different wavelengths, the optical equalizer 302 may adjust the spectrum of the signal light in such a way that a level difference between the optical carriers is reduced. The optical equalizer 302 may adjust the spectrum of the control light. The light output from the optical equalizer 302 is output to the terminal station 30 via the submarine cable 51.

For example, the control unit 130 sweeps the transmissive wavelength of the wavelength-variable filter 110 in such a way that the photoelectric conversion unit 120 outputs, to the control unit 130, the electric signal associated with the intensity associated with the wavelength of the signal light. With this, the control unit 130 is capable of acquiring the spectrum of the signal light (specifically, the relationship between the wavelength of the signal light and the intensity). When the acquired spectrum is different from a spectrum being a reference, the control unit 130 controls a property of the optical equalizer 302 (specifically, an attenuation amount associated with a wavelength) in such a way as to reduce the difference. With this, the spectrum of the signal light output from the repeater 40 can be modified into a more preferred shape.

The terminal station 20 transmits the control light including the control instruction in such a way that the optical equalizer 302 has a desired property. The predetermined parameter value (for example, the spectrum of the signal light being a reference) to be used for controlling the optical equalizer 302 may be stored in advance in the control unit 130, or may be notified in another control instruction from the terminal station 20.

Further, when the control instruction extracted from the control light is an instruction for specifying a setting of the spectrum of the signal light, the control unit 130 sets the property of the optical equalizer 302 as the shape associated with the content of the control instruction. For example, when the control instruction is an instruction for flattening the spectrum of the signal light, the control unit 130 controls a wavelength property of the optical equalizer 302 in such a way as to provide a wavelength property opposite to that of the spectrum of the signal light acquired by the control unit 130.

Third Example Embodiment

Figure 6:
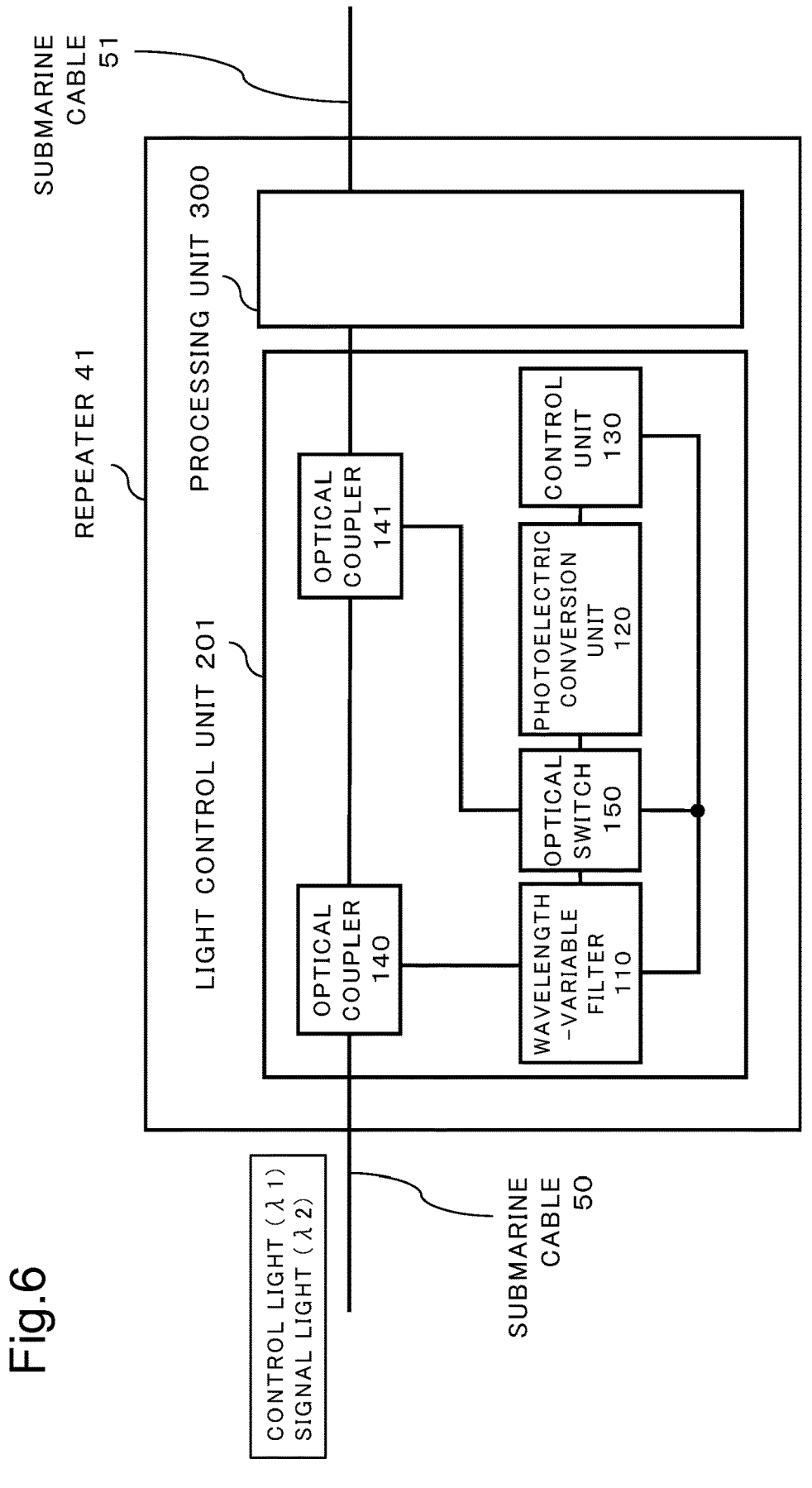
FIG. 6 is a block diagram illustrating a configuration example of a repeater 41 of a third example embodiment.

FIG. 6 is a block diagram illustrating a configuration example of a repeater 41 of a third example embodiment. The repeater 41 includes a light control unit 201 and the processing unit 300. The light control unit 201 is acquired by adding an optical coupler 141 and an optical switch 150 to the light control unit 200 of the second example embodiment. The repeater 41 may be used in the optical submarine cable system 1 in FIG. 3, in place of the repeater 40.

The optical switch 150 is arranged between an output of the wavelength-variable filter 110 and an input of the photoelectric conversion unit 120. The optical switch 150 is a 1×2 optical switch, and outputs the light input from the wavelength-variable filter 110 to any one of the two outputs according to the instruction from the control unit 130. One of the outputs of the optical switch 150 is connected to the photoelectric conversion unit 120, and the other of the outputs is connected to one of the inputs of the optical coupler 141.

The optical coupler 141 is an optical coupler (2×1) being optically coupled having two inputs and one output, and is an optical directional coupler, for example. The optical coupler 141 couples the input light, and outputs the light to the terminal station 30. One of the inputs of the optical coupler 141 is connected to one of the outputs of the optical coupler 140. The other of the inputs of the optical coupler 141 is connected to the other of the outputs of the optical switch 150. Specifically, the optical coupler 141 is capable of coupling the one piece of the light that is split by the optical coupler 140 and the light that is output from the wavelength-variable filter 110 via the optical switch 150.

When the control unit 130 receives the electric signal associated with the control light from the photoelectric conversion unit 120, the control unit 130 sets the transmissive wavelength in advance in such a way that only the control light passes through the wavelength-variable filter 110. Further, the control unit 130 controls the optical switch 150 in advance in such a way that the photoelectric conversion unit 120 receives the control light passing through the wavelength-variable filter 110. As a result, the control unit 130 is capable of receiving the electric signal associated with the control light from the photoelectric conversion unit 120. Information relating to a time at which the wavelength-variable filter 110 and the optical switch 150 are switched (specifically, a timing for controlling them) is stored as data in the control unit 130. For example, the timing information may be stored in advance in the control unit 130, based on the specifications of the control light in the optical submarine cable system 1 in which the repeater 41 is used. Further, for example, the repeater 41 may acquire the timing information from the terminal station 20 by using a function of communicating with the outside of the repeater 41 that the repeater 41 includes, and may cause the control unit 130 to store the timing information.

Figure 7:
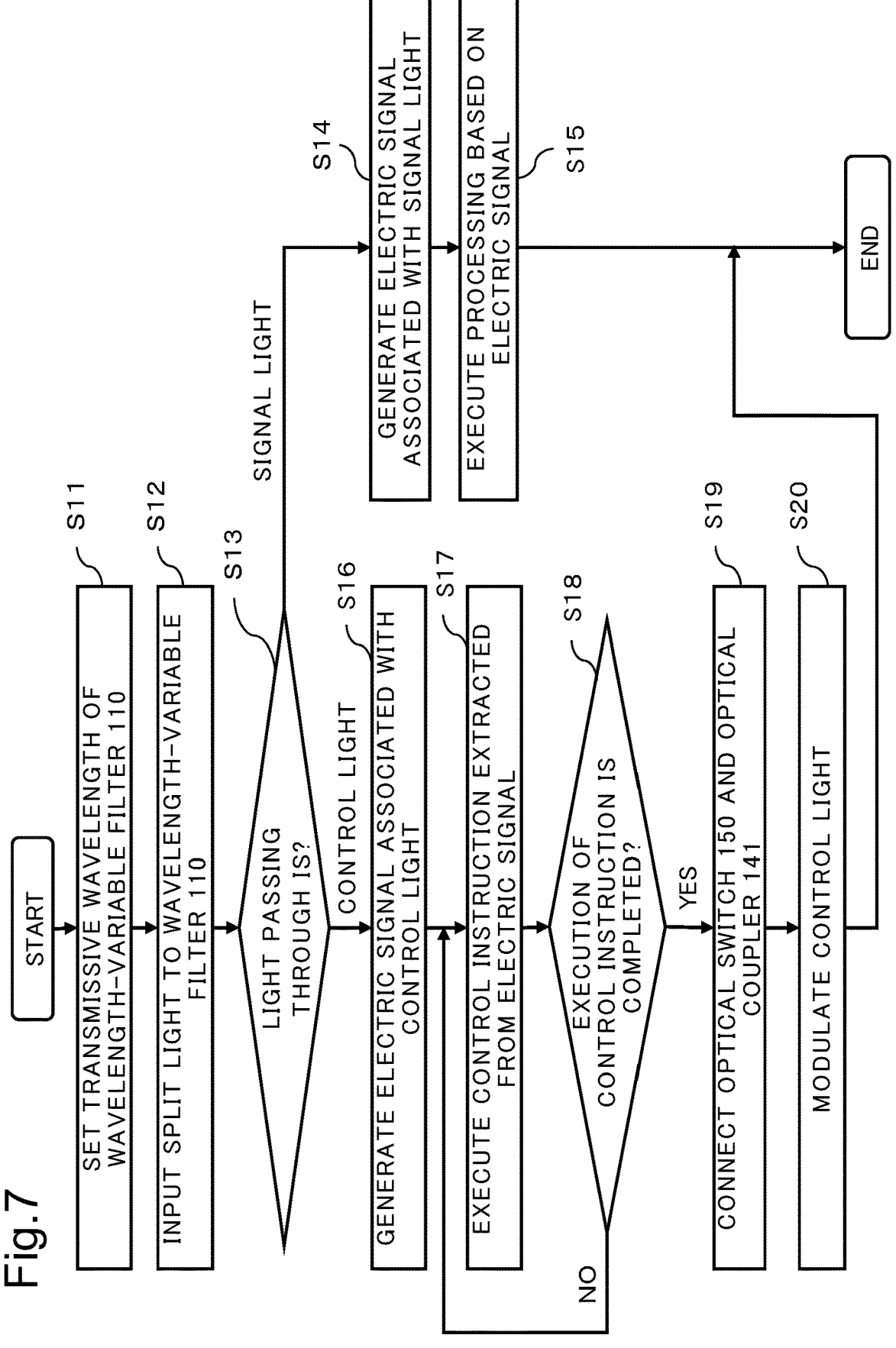
FIG. 7 is a flowchart illustrating an example of an operation procedure of the repeater 41.

FIG. 7 is a flowchart illustrating an example of an operation procedure of the repeater 41. The control unit 130 sets the transmissive wavelength of the wavelength-variable filter 110 (step S11 in FIG. 7). Further, the light split by the optical coupler 140 is input to the wavelength-variable filter 110 (step S12). When the light passing through the wavelength-variable filter 110 is the signal light (step S13: the signal light), the signal light is received by the photoelectric conversion unit 120, and the photoelectric conversion unit 120 generates the electric signal associated with the signal light (step S14). The control unit 130 executes the processing determined in advance, based on the electric signal generated from the signal light (for example, generating and storing the spectrum of the signal light) (step S15).

Meanwhile, when the light passing through the wavelength-variable filter 110 is the control light (step S13: the control light), the control light is received by the photoelectric conversion unit 120. The photoelectric conversion unit 120 generates the electric signal associated with the control light (step S16). The control unit 130 executes the control instruction extracted from the electric signal associated with the control light (step S17).

When transmission of the control light including the control instruction is completed, the terminal station 20 transmits non-modulated control light (continuous wave, CW). The non-modulated control light does not include a control instruction. Meanwhile, when execution of the control instruction is completed (step S18: YES), the control unit 130 connects the output of the optical switch 150 to the optical coupler 141 (step S19). Further, the control unit 130 modulates the non-modulated control light output from the wavelength-variable filter 110 by temporally changing the transmissive wavelength of the wavelength-variable filter 110 (step S20). For example, in step S20, the control unit 130 controls the wavelength-variable filter 110 in such a way that only the control light passes through during a period T1 and the control light or the signal light does not pass through during a subsequent period T2 while the control light is not modulated. By repeating this, the repeater 41 is capable of transmitting, to the terminal station 30, the modulated control light as a pulse width modulation signal by T1 and T2.

The control light subjected to pulse width modulation by the wavelength-variable filter 110 (hereinafter, referred to as "response light") may include information relating to the spectrum of the signal light acquired by the control unit 130 or information relating to an execution result of the control instruction. The contents of modulation in the wavelength-variable filter 110 (for example, the values T1 and T2) and the information associated therewith are shared in advance between the repeater 40 and the terminal station 30. The control unit 130 may be notified, in advance, of information included in a table as data included in the control instruction. The terminal station 30 is capable of extracting the information added to the response light by the repeater 40 by demodulating the response light. For example, the terminal station 30 is capable of extracting the information included in the response light by measuring the period T1 during which the response light is received and the period T2 during which the control light is not received and referring to the table using those values.

When there is no obstacle in demodulating the response light in the terminal station 30, the control light that is input to the wavelength-variable filter 110 at the time of generating the response light in the repeater 41 is not required to be non-modulated. Further, another submarine machine (for example, a repeater) including a function similar to that of the light control unit 200 or 201 may receive the response light output from the repeater 41, and the submarine machine may process the response light as the control light. The repeater 41 generates the response light including the control instruction, and another submarine machine that receives the response light extracts and executes the control instruction from the response light. With this, the repeater 41 is capable of controlling the another submarine machine according to the execution result of the control instruction in the repeater 41.

In the repeater 41 of the present example embodiment, the light control unit 201 modulates the control light received from the terminal station 20 by using the wavelength-variable filter, and thus generates the response light. With this configuration, the repeater 41 is capable of transmitting the information to the terminal station 30 or another submarine machine without providing a light source for transmitting the information or a driving circuit thereof. For example, with a simple configuration, the light control unit 201 is capable of achieving the repeater 41 further including a command/response function of receiving the control light and transmitting the control result (response) associated with the control instruction (command) extracted from the control light.

Fourth Example Embodiment

Figure 8:
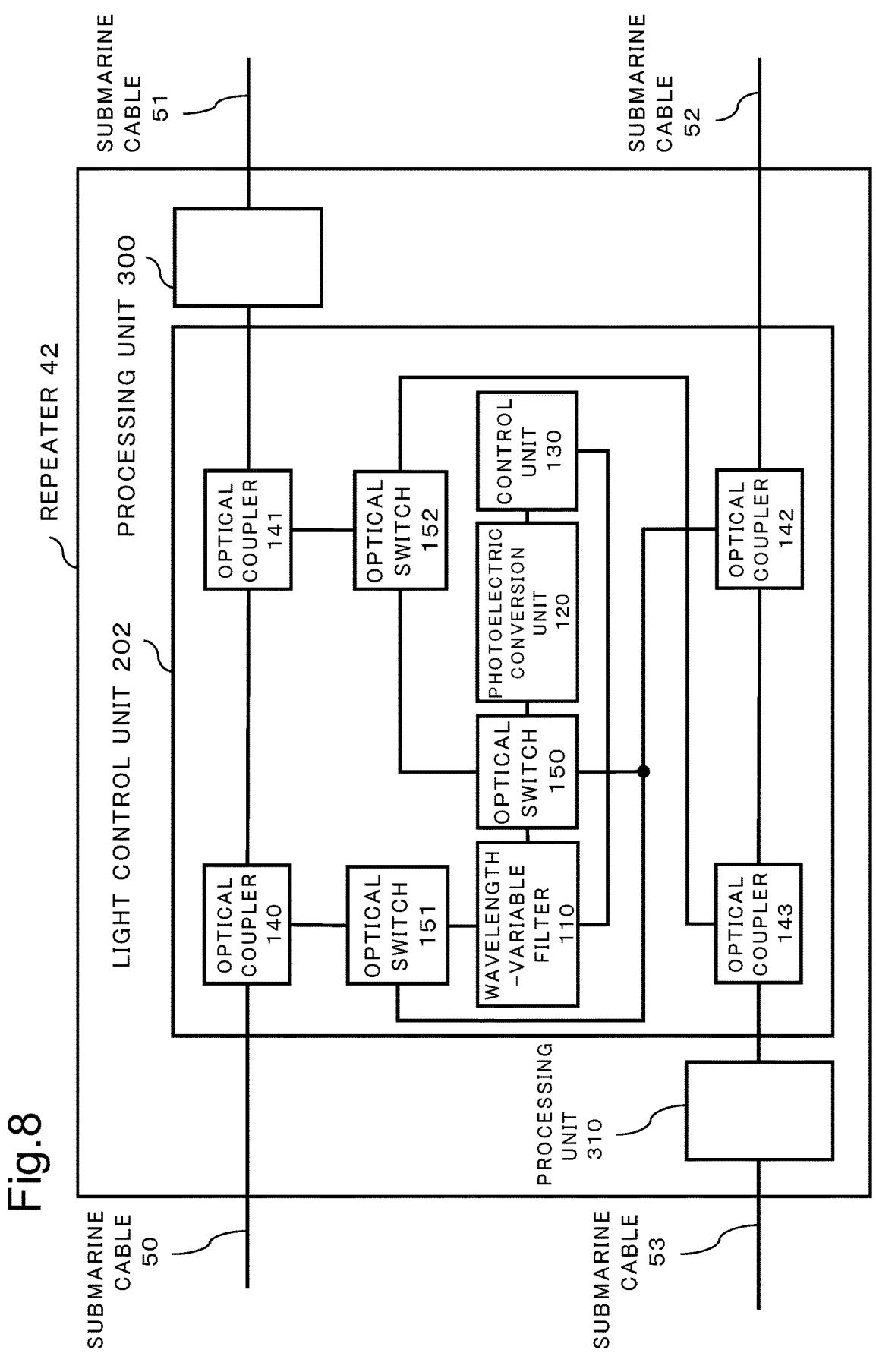
FIG. 8 is a block diagram illustrating a configuration example of a repeater 42 of a fourth example embodiment.

FIG. 8 is a block diagram illustrating a configuration example of a repeater 42 of a fourth example embodiment. The repeater 42 includes a light control unit 202 and processing units 300 and 310. The light control unit 202 includes a configuration acquired by further adding optical couplers 142 and 143 and optical switches 151 and 152 to the light control unit 200 of the third example embodiment. The processing units 300 and 310 are function blocks that provide the relay function of the repeater 40, and these functions are illustrated in the second example embodiment and the modification examples thereof. In FIG. 8, intersections of lines indicating connection between the blocks do not indicate coupling or division, except for the point indicated with the black circle mark.

In addition to the function of processing the signal light and the control light that are transmitted in the direction from the terminal station to the terminal station 30, the repeater 42 includes a function of processing the signal light and the control light that are transmitted in the direction from the terminal station 30 to the terminal station 20. The terminal station 30 transmits the control light and the signal light to the repeater 42 via the submarine cable 52. The repeater 42 processes the control light and the signal light that are received from the terminal station 30, and transmits the light associated with the result to the terminal station 20 via the submarine cable 53.

Hereinafter, the direction from the terminal station 20 to the terminal station 30 is referred to as a "downstream direction", and the direction from the terminal station 30 to the terminal station 20 is referred to as an "upstream direction". In the second example embodiment and the third example embodiment, the operations of the repeaters 40 and 41 for the light in the downstream direction are described. The repeater 42 of the present example embodiment is capable of executing processing for the light in the upstream direction, which is similar to the processing for the light in the downstream direction in the third example embodiment. In the repeater 42 of the present example embodiment, the processing unit 300 provides the function of relaying the light in the downstream direction, and the processing unit 310 provides the function of relaying the light in the upstream direction. The wavelength of the control light and the wavelength of the signal light in the upstream direction may be the same as or different from those in the downstream direction. The control unit 130 stores, as data, information relating to the wavelength of the control light and the reception time, and the wavelength of the signal light and the reception time in each of the downstream direction and the upstream direction. Based on the data, the control unit 130 controls the optical switches 150 to 152 and the wavelength-variable filter 110 at a suitable timing in such a way that the light in the upstream direction and the light in the downstream direction are subjected to the following processing.

The optical coupler 140 splits the input light in the downstream direction, outputs one of the split outputs to the optical switch 151, and outputs the other of the split outputs to the optical coupler 141. The optical coupler 142 splits the input light in the upstream direction, outputs one of the outputs to the optical switch 151, and outputs the other output to the optical coupler 143.

The optical switch 151 is a 2×1 optical switch having two inputs and one output, and outputs, to the wavelength-variable filter 110, one of the light in the downstream direction that is split by the optical coupler 141 and the light in the upstream direction that is split by the optical coupler 142. The optical switch 152 is a 1×2 optical switch having one input and two outputs, and outputs the light output from the optical switch 150 to the optical coupler 141 or 143. When the control light is modulated in the wavelength-variable filter 110, the optical switch 150 is controlled in such a way that the modulated light is output to the optical switch 152.

When the light control unit 202 processes the light in the downstream direction, the optical switch 151 is controlled in such a way that the light in the downstream direction is input to the wavelength-variable filter 110. Further, when the control light in the downstream direction is modulated in the wavelength-variable filter 110, the optical switch 152 is controlled in such a way that the modulated control light is output to the optical coupler 141. Meanwhile, when the light control unit 202 processes the light in the upstream direction, the optical switch 151 is controlled in such a way that the light in the upstream direction is input to the wavelength-variable filter 110. Further, when the control light in the upstream direction is modulated in the wavelength-variable filter 110, the optical switch 152 switches the optical path in such a way that the modulated control light is output to the optical coupler 143.

In the repeater 42 thus configured, the one light control unit 202 is commonly used for the processing for the light in the downstream direction and the processing for the light in the upstream direction. As a result, in addition to the effects of the repeater that are described in the second example embodiment and the third example embodiment, the repeater 42 exerts an effect of reducing the number of components and a mounting area for the repeater that relays the light in the upstream direction and the light in the downstream direction.

The whole or a part of the example embodiments described above can be described as, but not limited to, the following supplementary notes.

(Supplementary Note 1)

A light control device including:

a wavelength-variable filter configured to have a variable transmissive wavelength at which input light passes through;

a photoelectric conversion means for converting output light from the wavelength-variable filter into an electric signal; and a control means for setting the transmissive wavelength and outputting an instruction for controlling a communication device, based on the electric signal associated with the transmissive wavelength.

(Supplementary Note 2)

The light control device according to Supplementary Note 1, wherein, when the input light is light acquired by wavelength-multiplexing control light and signal light, the control means sets the transmissive wavelength as a wavelength of the control light, and controls the communication device, based on the electric signal.

(Supplementary Note 3)

The light control device according to Supplementary Note 1, wherein, when the input light is light acquired by wavelength-multiplexing control light and signal light, the control means sets the transmissive wavelength as a wavelength of the signal light, and monitors the signal light, based on the electric signal.

(Supplementary Note 4)

The light control device according to Supplementary Note 2 or 3, wherein the control means acquires a spectrum of at least one of the control light and the signal light by controlling the wavelength-variable filter in such a way as to sweep the transmissive wavelength.

(Supplementary Note 5)

The light control device according to any one of Supplementary Notes 2 to 4, further including a first optical coupler configured to split the input light and guide, to the wavelength-variable filter, one piece of the input light being split.

(Supplementary Note 6)

The light control device according to Supplementary Note 5, further including:

a second optical coupler; and a first optical switch, wherein the first optical coupler connects another piece of the input light being split, to one of inputs of the second optical coupler, the first optical switch outputs output light from the wavelength-variable filter to any one of another of the inputs of the second optical coupler and the photoelectric conversion means, the wavelength-variable filter outputs a response signal associated with the control light by controlling the transmissive wavelength, the first optical switch outputs the response signal to the second optical coupler, and the second optical coupler couples an output from the first optical switch and another piece of the input light being split in the first optical coupler.

(Supplementary Note 7)

The light control device according to Supplementary Note 6, further including:

a second optical switch configured to output, to the wavelength-variable filter, one of light being input from the first optical coupler and light being input from another optical line; and a third optical switch being provided between one of outputs of the first optical switch and one of the inputs of the second optical coupler, and configured to connect one of the outputs of the first optical switch to any one of one of the inputs of the second optical coupler and the another optical line.

(Supplementary Note 8)

A repeater including:

the light control device according to any one of Supplementary Notes 2 to 7, wherein the control means controls the repeater as the communication device.

(Supplementary Note 9)

The repeater according to Supplementary Note 8, further including:

a processing means for executing predetermined processing for at least one of the control light and the signal light, based on an instruction from the control means.

(Supplementary Note 10)

The repeater according to Supplementary Note 9, wherein the processing means includes at least one of an optical amplifier and an optical equalizer.

(Supplementary Note 11)

An optical submarine cable system, including:

the repeater according to any one of Supplementary Notes 8 to 10; and a terminal station configured to transmit the control light and the signal light to the repeater.

(Supplementary Note 12)

A method for controlling a light control device, the method including:

setting a transmissive wavelength at which input light passes through, to a wavelength-variable filter;

converting output light from the wavelength-variable filter into an electric signal; and controlling a communication device, based on the electric signal associated with the transmissive wavelength.

(Supplementary Note 13)

The method for controlling a light control device according to Supplementary Note 12, further comprising, when the input light is light acquired by wavelength-multiplexing control light and signal light:

setting the transmissive wavelength as a wavelength of the control light; and controlling the communication device, based on the electric signal.

(Supplementary Note 14)

The method for controlling a light control device according to Supplementary Note 12, further comprising, when the input light is light acquired by wavelength-multiplexing control light and signal light:

setting the transmissive wavelength as a wavelength of the signal light; and acquiring an optical property of the signal light, based on the electric signal.

(Supplementary Note 15)

The method for controlling a light control device according to Supplementary Note 13 or 14, further comprising acquiring a spectrum of at least one of the control light and the signal light by controlling the wavelength-variable filter in such a way as to sweep the transmissive wavelength.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, the configurations described in the example embodiments are not necessarily exclusive to one another. The actions and the effects of the present invention may be achieved by a configuration acquired by combining all or some of the example embodiments described above.

Some or all of the functions and the procedures described in each of the example embodiments described above may be achieved by a central processing unit (CPU) included in the control unit 130 that executes a program. The CPU may be provided to a location other than the control unit 130. The program is recorded in a fixed and non-temporary recording medium. The recording medium may be a semiconductor memory or a fixed magnetic disk device, but is not limited thereto.

This application is based upon and claims the benefit of priority from Japanese patent application No. 2021-033113, filed on Mar. 3, 2021, the disclosure of which is incorporated herein in its entirety by reference.

REFERENCE SIGNS LIST

1 Optical submarine cable system
10 Communication device
20, 30 Terminal station
40 to 42 Repeater
50 to 53 Submarine cable
100 Light control device
110 Wavelength-variable filter
120 Photoelectric conversion unit
130 Control unit
140 to 143 Optical coupler
150 to 152 Optical switch
200 to 202 Light control unit
300, 310 Processing unit
301 Optical amplifier
302 Optical equalizer

What is claimed is:

1. A light control device comprising:

a wavelength-variable filter configured to have a variable transmissive wavelength at which input light passes through;

a photoelectric converter configured to convert output light from the wavelength-variable filter into an electric signal;

a controller configured to set the transmissive wavelength and output an instruction for controlling a communication device, based on the electric signal associated with the transmissive wavelength, wherein when the input light is light acquired by wavelength-multiplexing control light and signal light, the controller sets the transmissive wavelength as a wavelength of the control light, and controls the communication device, based on the electric signal;

a first optical coupler configured to split the input light and guide, to the wavelength-variable filter, one piece of the input light being split;

a second optical coupler; and a first optical switch, wherein the first optical coupler connects another piece of the input light being split, to one of inputs of the second optical coupler, the first optical switch outputs output light from the wavelength-variable filter to any one of another of the inputs of the second optical coupler and the photoelectric converter, the wavelength-variable filter outputs a response signal associated with the control light by controlling the transmissive wavelength, the first optical switch outputs the response signal to the second optical coupler, and the second optical coupler couples an output from the first optical switch and another piece of the input light being split in the first optical coupler.

2. The light control device according to claim 1, wherein the controller acquires a spectrum of at least one of the control light and the signal light by controlling the wavelength-variable filter in such a way as to sweep the transmissive wavelength.

3. The light control device according to claim 1, further comprising:

a second optical switch configured to output, to the wavelength-variable filter, one of light being input from the first optical coupler and light being input from another optical line; and a third optical switch being provided between one of outputs of the first optical switch and one of the inputs of the second optical coupler, and configured to connect one of the outputs of the first optical switch to any one of one of the inputs of the second optical coupler and the another optical line.

4. A repeater comprising the light control device according to claim 1, wherein the controller controls the repeater as the communication device.

5. The repeater according to claim 4, further comprising a processor configured to execute predetermined processing for at least one of the control light and the signal light, based on an instruction from the controller.

6. The repeater according to claim 5, wherein the processor includes at least one of an optical amplifier and an optical equalizer.

7. An optical submarine cable system comprising:

the repeater according to claim 4; and a terminal station configured to transmit the control light and the signal light to the repeater.

8. A light control device comprising:

a wavelength-variable filter configured to have a variable transmissive wavelength at which input light passes through;

a photoelectric converter configured to convert output light from the wavelength-variable filter into an electric signal;

a controller configured to set the transmissive wavelength and output an instruction for controlling a communication device, based on the electric signal associated with the transmissive wavelength, wherein, when the input light is light acquired by wavelength-multiplexing control light and signal light, the controller sets the transmissive wavelength as a wavelength of the signal light, and monitors the signal light, based on the electric signal;

a first optical coupler configured to split the input light and guide, to the wavelength-variable filter, one piece of the input light being split;

a second optical coupler; and a first optical switch, wherein the first optical coupler connects another piece of the input light being split, to one of inputs of the second optical coupler, the first optical switch outputs output light from the wavelength-variable filter to any one of another of the inputs of the second optical coupler and the photoelectric converter, the wavelength-variable filter outputs a response signal associated with the control light by controlling the transmissive wavelength, the first optical switch outputs the response signal to the second optical coupler, and the second optical coupler couples an output from the first optical switch and another piece of the input light being split in the first optical coupler.

9. A method for controlling a light control device, the method comprising:

setting a transmissive wavelength at which input light passes through, to a wavelength-variable filter;

converting output light from the wavelength-variable filter into an electric signal; and controlling a communication device, based on the electric signal associated with the transmissive wavelength;

when the input light is light acquired by wavelength-multiplexing control light and signal light, setting the transmissive wavelength as a wavelength of the control light, and controlling the communication device, based on the electric signal;

by a first optical coupler, splitting the input light and guiding, to the wavelength-variable filter, one piece of the input light being split, and connecting another piece of the input light being split, to one of inputs of a second optical coupler;

by a first optical switch, outputting output light from the wavelength-variable filter to any one of another of the inputs of the second optical coupler and the photoelectric converter;

by the wavelength-variable filter, outputting a response signal associated with the control light by controlling the transmissive wavelength;

by the first optical switch, outputting the response signal to the second optical coupler; and by the second optical coupler, coupling an output from the first optical switch and another piece of the input light being split in the first optical coupler.

10. The method for controlling a light control device according to claim 9, further comprising acquiring a spectrum of at least one of the control light and the signal light by controlling the wavelength-variable filter in such a way as to sweep the transmissive wavelength.

* * * * *